United States Patent
Watanabe et al.

(10) Patent No.: US 7,128,939 B2
(45) Date of Patent: Oct. 31, 2006

(54) PRETREATMENT AGENT FOR A FISH FOOD

(75) Inventors: Manabu Watanabe, Gunma (JP); Masata Mitsuiki, Gunma (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 10/971,135

(22) Filed: Oct. 25, 2004

(65) Prior Publication Data

US 2005/0058765 A1   Mar. 17, 2005

Related U.S. Application Data

(63) Continuation of application No. PCT/JP03/04822, filed on Apr. 16, 2003.

(30) Foreign Application Priority Data

Apr. 25, 2002  (JP) .............................. 2002-124716

(51) Int. Cl.
   *A23L 1/325*  (2006.01)
(52) U.S. Cl. ..................... 426/643; 426/89; 426/92; 426/262; 426/310; 426/321; 426/327; 426/331; 426/332; 426/652
(58) Field of Classification Search ............... 426/643, 426/89, 92, 262, 310, 321, 327, 331–332, 426/652
   See application file for complete search history.

(56) References Cited

U.S. PATENT DOCUMENTS

| | | | | |
|---|---|---|---|---|
| 2,839,410 A | * | 6/1958 | Helgerud et al. | 426/327 |
| 2,875,061 A | * | 2/1959 | Vogel et al. | 426/643 |
| 3,852,489 A | * | 12/1974 | Yip | 426/268 |
| 4,579,741 A | * | 4/1986 | Hanson et al. | 426/92 |
| 4,992,295 A | * | 2/1991 | Ueno et al. | 426/643 |
| 5,028,444 A | * | 7/1991 | Yamamoto et al. | 426/332 |
| 5,137,746 A | * | 8/1992 | Kanayama et al. | 426/643 |
| 5,213,833 A | * | 5/1993 | Yamada et al. | 426/542 |
| 5,344,665 A | * | 9/1994 | Kanayama et al. | 426/643 |
| 5,523,102 A | * | 6/1996 | Morasch | 426/296 |
| 5,718,932 A | * | 2/1998 | Nakao et al. | 426/104 |
| 6,001,398 A | * | 12/1999 | Noda et al. | 426/59 |

FOREIGN PATENT DOCUMENTS

| | | |
|---|---|---|
| JP | 59-179051 A | 10/1984 |
| JP | 60-199339 A | 10/1985 |
| JP | 62-044148 | 2/1987 |
| JP | 05-015344 A | 1/1993 |
| JP | 06-165634 A | 6/1994 |
| JP | 07-236413 | 9/1995 |
| JP | 07-322853 A | 12/1995 |
| JP | 08-182477 A | 7/1996 |
| JP | 09-098746 A | 4/1997 |
| JP | 2000-116340 A | 4/2000 |
| JP | 2001-252049 A | 9/2001 |
| JP | 2001-292733 A | 10/2001 |
| JP | 2002-051693 A | 2/2002 |

* cited by examiner

*Primary Examiner*—Milton I. Cano
*Assistant Examiner*—Adepeju O. Pearse
(74) *Attorney, Agent, or Firm*—Oblon, Spivak, McClelland, Maier & Neustadt, P.C.

(57) ABSTRACT

The present invention is a pretreatment agent for a fish food which comprises, in a mixture, 1–30% (v/v) of ethanol, 5–25% (w/v) of citrate and 0.5–50% (w/v) of at least one inorganic salt selected from the group consisting of phosphate, carbonate and bicarbonate, and a process for pretreating a fish food which comprises contacting the pretreatment agent with the fish food.

15 Claims, No Drawings

PRETREATMENT AGENT FOR A FISH FOOD

CONTINUING APPLICATION DATA

This application is a continuation of international application No. PCT/JP03/04822, filed on Apr. 16, 2003, which claims priority to Japanese application No. 2002-124716, filed on Apr. 25, 2002. Both of those applications are incorporated herein by reference.

BACKGROUND OF THE INVENTION

1. Field of the Invention

The present invention relates to a pretreatment agent for a fish food, namely fish and shellfish with which the yield can increase and palate feeling can be kept good, and to a process for pretreating a fish food. More particularly, it relates to a pretreatment agent for a fish food which is effective to significantly increase the yield and to retain palate feeling and good appearance during heating and cooking a fish food, especially frozen ones in a microwave oven, and to a process for pretreating a fish food using said pretreatment agent.

2. Discussion of the Background

When a fish food, especially one once placed in a frozen state is heated and cooked, a remarkable exudation of water, a lowering in the yield and shrinkage of its body occur to result in the deterioration such as hard palate feeling and unfavorable appearance.

As means to solve deterioration of quality, a number of pretreatment agents for a fish food have been hitherto developed. There have been proposed processes wherein a fish food is immersed in an aqueous solution of the respective pretreatment agents as shown below. Various polyphosphates (JP 60-199339 A), sodium chloride and albumen (JP 59-179051 A), sodium chloride and an inorganic salt (JP 06-165634 A), calcined calcium (JP 07-322853 A), organic acid fermenting solution (JP 2000-116340 A), transglutaminase (JP 08-182477 A), and the mixture thereof (JP 08-182477 A, JP 09-98746 A, JP 2001-292733 A and JP 2002-51693 A). There have also been proposed a process for contacting a fish food with a mixture of an organic acid salt, sodium chloride, starch, albumen, etc. (JP 05-15344 A).

Even in these processes, however, when a frozen fish food was subjected to heating for a long time, to repeated heating or to severe heating such as heating in a microwave oven, the exudation of water from one cannot be inhibited sufficiently. Therefore, satisfactory quality of fish food could not be obtained in the appearance and palate feeling, due to shrinkage of its body and its hardened property such as dry product. Also, a pretreatment agent consisting of an aqueous solution containing 1–30% (v/v) of ethanol and 5–25% (w/v) of an organic acid salt has been proposed (JP 2001-252049 A). However, even in this process wherein said aqueous solution is used by itself or in combination with an inorganic salt such as sodium chloride, the intended effect can not be achieved by heating under the severe condition as above-stated whereas a good yield, a good palate feeling and natural quality can be achieved by heating under a relatively moderate condition. Also, as in a pretreatment agent containing polyphosphate as the main ingredient, unnatural transparency appears on fish food after the pretreatment and the palate feeling becomes watery. Furthermore, there are some pretreatment agents to be concerned about the influence on the health. The fish food pretreated with a pretreatment agent containing alkaline calcined calcium and an inorganic salt as the main ingredient is susceptible to getting black after heating owing to the promotion of oxidation in the presence of an alkali. There are many pretreatment agents having other problems than just stated.

SUMMARY OF THE INVENTION

An object of the present invention is to provide a pretreatment agent for a fish food which inhibits the lowering in yield by heating and cooking a frozen food and which keeps a good palate feeling without giving any unnaturalness to a palate feeling and a taste, and its pretreating process.

As a result of having ardently studied to achieve the above object, the present inventors have found that a pretreatment agent which comprises an aqueous solution containing 1–30% (v/v) of ethanol and 5–25% (w/v) of a citrate mixed with 0.5–50% (w/v) of at least one inorganic salt selected from the group consisting of a phosphate, a carbonate and a bicarbonate, and a pretreatment agent mixture obtained by incorporating a prescribed amount of a starch and/or a food protein, etc. into said pretreatment agent, said pretreatment agent mixture showing higher yield after heat-cooking and natural palate feeling are the preferred pretreatment agents for a fish food for solving the above deterioration. It has been further found that in order to bring out the effect of these pretreatment agents to the maximum, if fish food gets contacted with at least one of said pretreatment agents and thereafter the resultant mixture is chilled and preserved in the prescribed time, any blocking phenomenon among fish foods placed in the chilled state does not occur and the precipitation of the powders present in the pretreatment agent added and the separation of water are not found. The present invention has been completed based on the above findings.

That is, the invention involving in claim 1 is a pretreatment agent for a fish food which comprises an aqueous solution containing 1–30% (v/v) of ethanol and 5–25% (w/v) of a citrate mixed with 0.5–50% (w/v) of at least one inorganic salt selected from the group consisting of a phosphate, a carbonate and a bicarbonate, one involving in claim 2 is the pretreatment agent as claimed in claim 1 wherein the inorganic salt is characterized by containing sodium and/or potassium salts of phosphoric acid, one involving in claim 3 is the pretreatment agent mixture for a fish food which comprises incorporated 0.5–10 parts by weight of at least one member selected from the group consisting of a starch and a food protein into one part by weight of the pretreatment agent as claimed in any one of claims 1–2, one involving in claim 4 is the pretreatment agent mixture as claimed in claim 3 wherein said starch is raw starch derived from potato and/or tapioca or modified starch thereof, one involving in claim 5 is the pretreatment agent mixture as claimed in claim 3 wherein the food protein is at least one selected from the group consisting of albumen, soybean protein and milk protein, one involving in claim 6 is a process for pretreating a fish food which is characterized by incorporating into the fish food water and/or an ice together with the pretreatment agent or the pretreatment agent mixture as claimed in any one of claims 1–5 in such a proportion that 1–25 parts by weight of water and/or an ice is present based on one part by weight of the pretreatment agent or the pretreatment agent mixture and thereafter mixing the resultant mixture for 0.5–20 minutes, one involving in claim 7 is a process for pretreating a fish food which is characterized by contacting the fish food with the pretreatment agent or the pretreatment agent mixture as claimed in any one of claims 1–5 and thereafter preserving the resultant mixture for 3–48 hours in a chilled state, one involving in claim 8 is the pretreatment agent or the pretreatment agent mixture as claimed in any one of claims 1–5 wherein the fish food is frozen shrimp or frozen cuttlefish, and one involving in claim 9 is the process as claimed in any one of claims 6–7 wherein the fish food is frozen shrimp or frozen cuttlefish.

DETAILED DESCRIPTION OF THE
PREFERRED EMBODIMENTS

The followings illustrate the present invention in detail.

An aqueous solution containing 1–30% (v/v) of ethanol and 5–25% (w/v) of a citrate which may be used as a part of the constituent ingredients of the pretreating agent in the present invention is not restricted particularly so long as the solution satisfies this condition. In the present invention, when each concentration of ethanol and citrate is too high or when it is too low, the effect decreases and therefore it is not preferable.

The citrate for use in the present invention is not restricted particularly so long as it is sodium salt and/or potassium salt. However, trisodium citrate is preferred for its effect to increase the yield.

As at least one inorganic salt selected from the group consisting of a phosphate, a carbonate and a bicarbonate, the respective sodium and potassium salts are especially preferred. For example, trisodium phosphate, disodium phosphate, monopotassium disodium phosphate, sodium carbonate, potassium carbonate, sodium bicarbonate and so on are selected properly. Various kinds of sodium and potassium salts of phosphoric acid are especially preferred for their improved effects in the yield and the palate feeling.

Although the ratio of at least one inorganic salt selected from the group consisting of a phosphate, a carbonate and a bicarbonate in the pretreatment agent which comprises an aqueous solution containing ethanol and citrate mixed with the inorganic salt is not restricted particularly, in either case where the ratio of the inorganic salt added is too high or it is too low the effect decreases. Therefore, the inorganic salt is added so as to contain 0.5–50% (w/v), preferably 5–40% (w/v) based on the total volume of the pretreatment agent.

A starch is used for improving the yield in the heat-cooked fish food with the pretreatment agent of the present invention, and the variety of starch is not restricted particularly so long as it has a high water-retaining property and does not adversely affect the palate feeling. However, raw starches derived from potato and/or tapioca or their modified products are preferred. The modified product of starch defined herein means one subjected to chemical treatment including general crosslinking treatment and substitution treatment, and one subjected to physical treatment such as wet heat treatment or the like.

A food protein is also used for improving the yield in the heat-cooked fish food with the pretreatment agent of the present invention like a starch, and the variety of food protein is not restricted particularly so long as it has a high water-retaining property and does not adversely affect palate feeling. However, it is preferable to use at least one protein selected from the group consisting of albumen, soybean protein and milk protein. In order to mix the pretreatment agent with fish food smoothly, it is especially preferred to use albumen, which is capable of imparting smoothness into the resultant mixture.

The mixing ratio of a starch and/or a food protein to the pretreatment agent which comprises an aqueous solution containing ethanol and citrate mixed with at least one inorganic salt selected from the group consisting of a phosphate, a carbonate and a bicarbonate is not restricted particularly.

However, when it is too low the effect to increase the yield is low.

Contrary thereto, when it is too high a blocking phenomenon among fish foods occurs after mixing the pretreatment agent with them and subsequently chilling the resultant mixture and further shrimp inherent juicy palate feeling is impaired. Therefore, a starch and/or a food protein are added in an amount of 0.5–10 parts by weight, preferably 2–5 parts by weight per one part by weight of said pretreatment agent. In order to mix the pretreatment agent with fish food smoothly and to attain the desired water-retaining effect without accompanying unnatural palate feeling, it is preferable that a starch is added in combination with albumen.

In addition to a starch and a food protein, there may be suitably incorporated into the pretreatment agent sodium chloride, a seasoning agent, an oligosaccharide, a polysaccharide, an amino acid, an oil and fat, an emulsifier, a coloring agent and an antioxidant, if necessary, to such an extent that they do not adversely affect the yield, the palate feeling and the taste.

When the amount added to fish food of the pretreatment agent which comprises an aqueous solution containing ethanol and citrate mixed with at least one mineral acid salt selected from the group consisting of a phosphate, a carbonate and a bicarbonate is too small, the intended effect can not be obtained. Contrary thereto, when it is too large the effect does not increase correspondingly and an increase in cost occurs. Therefore, it is preferably 0.2–6% (w/w), more preferably 0.5–3% (w/w) based on fish food.

For improving the yield, the palate feeling and the property of mixing the fish food with the pretreatment agent in the present invention, water and/or an ice may be added to the fish food pretreated together with the pretreatment agent, a starch and/or a food protein. The amount added of water and/or an ice may be suitably decided depending on the variety and the state of fish food and the formulation of the pretreatment agent to be added. However, when the amount is too high the deterioration of palate feeling occurs, while hard palate feeling occurs, and a blocking phenomenon of fish foods does after mixed together when it is too low. Therefore, water and/or an ice are added in a range of 1–20 parts by weight, preferably 2–15 parts by weight based on 1 part by weight of the pretreatment agent.

In the pretreating process of the present invention, the mixing condition of fish food with the pretreatment agent (which includes the pretreatment agent mixture containing further a starch and/or a food protein, hereinafter the same) is an important factor for obtaining the desired yield and palate feeling.

The adequate mixing time in this case is determined by certifying the condition that fish food treated with pretreatment agent reaches to sticky property while mixing. Subsequently the pretreated fish food is chilled and preserved and there are realized such states that any blocking phenomenon among the preserved fish food in a chilled state does not occur as well as the precipitation of the powders present in the pretreatment agent and the separation of water, thus the effect of the present invention may be exerted to the maximum. Accordingly the preferable time for mixing the pretreatment agent with the fish food may be suitably decided depending on the state of fish food, the formulation of the pretreatment agent and the mechanism of a mixing machine (shape of mixing vane, rotation speed, etc.) if the preferable states of the pretreated fish food after preservation in a chilled state are realized as stated above. Although the mixing temperature is not particularly restricted, it is preferable that it is in a range of 0–20° C. so as not to cause the deterioration of quality in the fish food such as lowering in the freshness and getting black accompanied by an elevation in temperature.

The term "blocking phenomenon of the pretreated fish food after preserved in a chilled state" is defined in the present invention as the phenomenon that some pieces of fish food are in a state adhered tightly one another and difficult to separate. When the pretreated fish food is stuck together, it is not preferable because it is difficult for the pretreated fish food to disperse uniformly in the next procedure such as heating and mixing and because the pretreated fish food gets torn into small pieces.

The precipitation of the powders present in the pretreatment agent means that powdery ingredients such as citrate; at least one inorganic salt selected from the group consisting of a phosphate, a carbonate and a bicarbonate; a starch and the like are not sufficiently dissolved and dispersed in aqueous medium after mixing with fish food, and indicates that they are in a state of the layered block at the bottom of the resultant mixture upon separating from the pretreated fish food after preservation in a chilled state. When the pretreated fish food is in such a state, it is not preferable because the effect of the pretreatment agent in the present invention cannot be exerted sufficiently.

The separation of water after the pretreated fish food have been chilled and preserved means that the absorbance of water by fish food to be pretreated and the dispersion of the pretreatment agent does not occur sufficiently due to their insufficient mixing and dispersing, and that water separates from the pretreated fish food after preserved in a chilled state. When the pretreated fish food is in such a state, it is not preferable because the effect of the pretreatment agent in the present invention cannot be exerted sufficiently.

In preserving the pretreated fish food in a chilled state, the chilling temperature is kept to 0–10° C., preferably 3–5° C. to prevent proliferation of microorganisms and the deterioration of quality.

As to the preservation time for the chilled fish food after mixing with the pretreatment agent in the present invention, if it is too short, the pretreatment agent does not sufficiently penetrate into fish food so that the effect of the present invention cannot be achieved, while if it is too long, a blocking phenomenon among fish foods tends to occur and further the deterioration of quality in fish food such as the lowering in freshness, getting black, etc. occurs. Therefore, it is set to 3–48 hours, preferably 6–24 hours.

The fish food for use in the present invention is not particularly restricted by its kind, state and form, and may be any state and form including raw, frozen, shucked and cut one and one with shuck. Furthermore, the pretreatment agent and the pretreating process of the present invention may be applied to chicken, pork, beef, the processed products thereof, etc. whereby there can be obtained the improved effect in the yield and the palate feeling. The fish food to be pretreated with significantly high effect in the present invention is the frozen shrimp and cuttlefish, and the yield and the quality such as palate feeling may greatly increase in comparison with the prior arts.

Even when the pretreated food obtained by the pretreating process as stated above was exposed to a long time of heating, to the repeated heating or to a severe heating such as heating in a microwave oven for the frozen product, a good palate feeling can be retained without occurring the lowering in the yield.

The present invention is further illustrated specifically by the following examples. However, the present invention is not restricted to these examples.

EXAMPLES

Example 1

Frozen shucked shrimp (300 g in each test) was thawed and thereafter each of various kinds of pretreatment agents or various kinds of pretreatment agent mixtures was directly added thereto. And then the mixture was stirred for a minute and kept in a refrigerator (5 ° C.) over a night (for 16 hours).

As the comparison products, the pretreated shrimps were prepared by addition of Controls 1–8 shown below.

Control 1: no pretreatment agent was added.
Control 2: sodium chloride was added.
Control 3: sodium chloride, sodium phosphate and monosodium L-glutamate (MSG) were added.
Control 4: sodium chloride and sodium polyphosphate were added.
Control 5: sodium chloride and sodium bicarbonate were added.
Control 6: sodium chloride and calcined shell calcium were added.
Control 7: sodium chloride, albumen, potato starch, sodium phosphate, MSG and water were added.
Control 8: sodium chloride and "Yield Up" [a product of Mercian Co., Ltd. which is an aqueous solution containing 10.3% (v/v) of ethanol and 13.5% (v/w) of sodium citrate] were added.

As the products involved in the present invention, the pretreated shrimps were prepared by addition of Samples 1 and 2 shown below.

Sample 1 involving in the present invention: sodium chloride, sodium phosphate, MSG, water and "Yield Up" were added.

Sample 2 involving in the present invention: sodium chloride, albumen, potato starch, sodium phosphate, MSG, water and "Yield Up" were added. Incidentally, Controls 2–8 pretreatment agents were prepared with reference to the prior art literatures shown previously.

The details of the above scattering are shown in table 1.

TABLE 1

| | Proportion to Shrimp (%) | | | | | | | | | | |
|---|---|---|---|---|---|---|---|---|---|---|---|
| | Shrimp | Sodium Polyphosphate | Sodium Biphosphate | Shell Baked Calcium | Albumen | Potato Starch | Sodium Chloride | Water | Sodium Phosphate | MSG | "Yield Up" |
| Control 1 | 100 | | | | | | | | | | |
| Control 2 | 100 | | | | | | 2.46 | | | | |
| Control 3 | 100 | | | | | | 2.46 | | 0.43 | 0.44 | |
| Control 4 | 100 | 0.12 | | | | | 2.46 | | | | |
| Control 5 | 100 | | 0.11 | | | | 2.46 | | | | |
| Control 6 | 100 | | | 0.3 | | | 2.46 | | | | |
| Control 7 | 100 | | | | 2.99 | 2.5 | 2.67 | 6.41 | 0.43 | 0.44 | |
| Control 8 | 100 | | | | | | 2.67 | | | | 1 |
| Sample 1 | 100 | | | | | | 2.67 | 6.41 | 0.43 | 0.44 | 1 |
| Sample 2 | 100 | | | | 2.99 | 2.5 | 2.67 | 6.41 | 0.43 | 0.44 | 1 |

With respect to the pretreated shrimp obtained in the above scattering, boiling treatment was conducted by heating at 100° C. for a minute at a ratio of 100 g of shrimp/1 liter of water. Also, steam treatment was conducted by heating 100 g of shrimp for 15 minutes under a constant heat power using a steamer. At this time, the yield was calculated based on the ratio by weight (%) derived from the weight gap of the pretreated shrimp before and after heating. Further, sensory evaluation was made with respect to the palate feeling of shrimp after heating.

10 expert panels were used for the sensory evaluation. The results are shown in table 2.

As is apparent from these results, Controls 2–6 and 8 conducted based on the prior arts including untreated Control 1 showed a low tendency in the boiled and steamed yield and their sensory evaluation revealed that they have hard and dry shrimp-like feelings and no juicy feeling and cause a great deterioration in the palate feeling. Also, Control 7 gives relatively high yield but its palate feeling is not preferable owing to its soft feeling unlike shrimp's inherent natural juicy feeling. On the other hand, although Sample 1 involving in the present invention causes a slight lowering in the boiled yield in comparison with Control 7, it has a natural hardness and a juicy feeling and a good palate

TABLE 2

| | Boil treatment | | | Steam treatment | | |
|---|---|---|---|---|---|---|
| | Yield | Sensory evaluation | | Yield | Sensory evaluation | |
| | (%) | Evaluation | Comment | (%) | Evaluation | Comment |
| Control 1 | 55.5 | X | Dry shrimp-like | 48.6 | X | Dry shrimp-like |
| Control 2 | 77.6 | Δ | Hard and powdery | 60.3 | X | Dry shrimp-like |
| Control 3 | 74.5 | ○ | Hard and no juicy feeling | 60.2 | X | Dry shrimp-like |
| Control 4 | 74.8 | ○ | Hard and watery | 60.8 | X | Dry shrimp-like |
| Control 5 | 72.7 | ○ | Slightly hard and no juicy feeling | 60.5 | X | Dry shrimp-like |
| Control 6 | 75.0 | ○ | Hard and dry shrimp-like with bitter taste | 54.2 | X | Dry shrimp-like |
| Control 7 | 93.8 | Δ | Soft and no juicy feeling | 87.6 | Δ | Soft and no juicy feeling |
| Control 8 | 64.6 | Δ | Dry and no juicy feeling | 80.4 | Δ | Slightly dry and no juicy feeling |
| Sample 1 | 82.6 | ○ | Slightly hard and juicy feeling | 85.4 | ○ | Slightly hard and juicy feeling |
| Sample 2 | 91.2 | ◎ | Hard and strong juicy feeling | 96.4 | ◎ | Hard and strong juicy feeling |

(◎: very good  ○: good  Δ: slightly bad  X: bad)

feeling. Also, despite Sample 2 involving in the present invention gives higher yield by about 10% than that of Sample 1, it retains stronger natural hardness, juicy feeling and good palate feeling. Therefore, it became apparent that high yield and natural good palate feeling that could not be achieved by the prior arts can be realized by using the pretreatment agent and the preptreating process of the present invention.

Example 2

Frozen shucked shrimp (30 g in each test) was thawed and thereafter followed by addition of a pretreatment agent and stirring of the mixture. The pretreatment agent mixture was based on Sample 2 involving in the present invention which caused the best effect in Example 1 and there were directly added to the thawed shrimp sodium chloride, albumen, potato starch, sodium phosphate, MSG, water and "Yield Up", and the stirring time was adjusted to 3, 5 and 7 minutes. A puddle mixer was used as mixing machine.

The detail of the above scattering is shown in table 3.

TABLE 3

|  | Shrimp | Albumen | Potato Starch | Sodium Chloride | Water | Sodium Phosphate | MSG | "Yield Up" |
| --- | --- | --- | --- | --- | --- | --- | --- | --- |
| Formulation of Pretreatment (% by weight) | 100 | 4.5 | 3.735 | 2.66 | 25.3 | 0.86 | 0.88 | 2 |

With respect to the pretreated shrimp obtained in the above its state immediately after mixing and that after refrigeration were observed and the yield after boiling heat treatment (at 95° C. for 2 minutes and 30 seconds) was determined. The results are shown in table 4.

TABLE 4

|  |  | Before refrigeration |  | After refrigeration | | |
| --- | --- | --- | --- | --- | --- | --- |
|  | Mixing Time (Min.) | State of Shrimp immediately after the Mixing | Cutting Off of Shrimp | Precipitation of Starch | Separation of Water | Yield (%) |
| Sample 1 | 3 | Sloppy and watery state | Not Occurred | Occurred | Occurred | 81.2 |
| Sample 2 | 5 | Low viscosity and smooth State | Not Occurred | Not Occurred | Not Occurred | 91.0 |
| Sample 3 | 7 | High viscosity and tight State | Slightly Occurred | Not Occurred | Not Occurred | 84.6 |

As is apparent from these results, all of Samples 1–3 involving in the present invention caused high yield and rendered the both states of shrimp before and after refrigeration preferable. Among them, in the case of Sample 1 the state of shrimp immediately after mixing was watery and the precipitation of powder present in the pretreatment agent and the separation of water occurred after refrigeration, and the yield was the lowest. In the case of Sample 3, the state of shrimp immediately after mixing was high viscosity and tight, and the precipitation of the powders present in the pretreatment agent and the separation of water did not occur after refrigeration. However, some broken shrimps were found to result in slightly lower yield. Also, shrimps adhered tightly each other so that they were difficult to separate and the handling manner was inferior. In the case of Sample No. 2, the state of shrimp after mixing was smooth and the viscosity was low. The precipitation of powder present in the pretreatment agent and the separation of water did not occur after refrigeration and the separation among shrimps was good. Also, the yield was the highest. Therefore, it can be said that the desired mixing condition in the present invention was the most efficiently realized by the mixing condition for Sample 2.

Other type of mixers such as ribbon mixer and a rotary mixer, etc. was subjected to the same mixing experiments as above. As a result, the mixing period with other mixers required for obtaining the same state as Sample 2 in Example 2 is different from that of Sample 2. However, it was possible to obtain preferable pretreated shrimp by modifying mixing period. Accordingly it was found that the present invention was realized to produce the preferable fish food after chilled preservation so as not to cause any blocking phenomenon among pieces of fish food, the precipitation of the powders present in the added pretreatment agent, and the separation of water.

The similar experiment as above is conducted with selection of a suitable mixing machine and mixing time with respect to the frozen cuttlefish whereby satisfactory pretreated cuttlefish can be obtained.

Advantages of the Invention

According to the present invention, there can be provided a fish food which retains good inherent palate feeling and taste with inhibiting the lowering in the yield caused by heating and cooking a frozen food, etc. without deteriorating palate feeling and taste.

The invention claimed is:

1. A pretreatment agent for a fish food which comprises mixed together 1–30% (v/v) of ethanol, 5–25% (w/v) of citrate and 0.5–50% (w/v) of at least one inorganic salt selected from the group consisting of phosphate, carbonate and bicarbonate.

2. The pretreatment agent of claim 1 wherein the inorganic salt is one containing sodium and/or potassium phosphate.

3. A pretreatment agent mixture for a fish food which comprises incorporated 0.5–10 parts by weight of at least one selected from the group consisting of a starch and a food protein into 1 part by weight of the pretreatment agent of claim 1.

4. The pretreatment agent mixture of claim 3 wherein the starch is potato starch and/or raw starch derived from tapioca starch or modified starch thereof.

5. The pretreatment agent mixture of claim 3 wherein the food protein is at least one selected from the group consisting of albumen, soybean protein and milk protein.

6. A process for pretreating a fish food which comprises adding water and/or ice together with the pretreatment agent of claim 1 to the fish food so as to amount to 1–25 parts by weight based on 1 part by weight of the pretreatment agent and stirring the resultant mixture for 5 to 7 minutes.

7. A process for pretreating a fish food which comprises contacting the fish food with the pretreatment agent of claim 1 and storing in chilled state for 3–48 hours.

8. The pretreatment agent of claim 1 wherein the fish food is a frozen shrimp or a frozen cuttlefish.

9. The process of claim 6 wherein the fish food is a frozen shrimp or a frozen cuttlefish.

10. The process of claim 7 wherein the fish food is a frozen shrimp or a frozen cuttlefish.

11. A process for pretreating a fish food which comprises adding water and/or ice together with the pretreatment agent mixture of claim 3 to the fish food so as to amount to 1–25 parts by weight based on 1 part by weight of the pretreatment agent mixture and stirring the resultant mixture for 5 to 7 minutes.

12. The process of claim 11 wherein the fish food is a frozen shrimp or a frozen cuttlefish.

13. A process for pretreating a fish food which comprises contacting the fish food with the pretreatment agent mixture of claim 3 and storing in chilled state for 3–48 hours.

14. The process of claim 13 wherein the fish food is a frozen shrimp or a frozen cuttlefish.

15. The pretreatment agent mixture of claim 3 wherein the fish food is a frozen shrimp or a frozen cuttlefish.

* * * * *